June 6, 1950

Z. TAKATS 2,510,529

DIVING AND CLIMBING TARGET SIMULATOR FOR GROUND TRAINERS

Filed Feb. 21, 1945

ZOLTAN TAKATS
*INVENTOR.*

BY Donald T. Hillier

Philip S. Hopkins

ATTORNEYS

ZOLTAN TAKATS
INVENTOR.

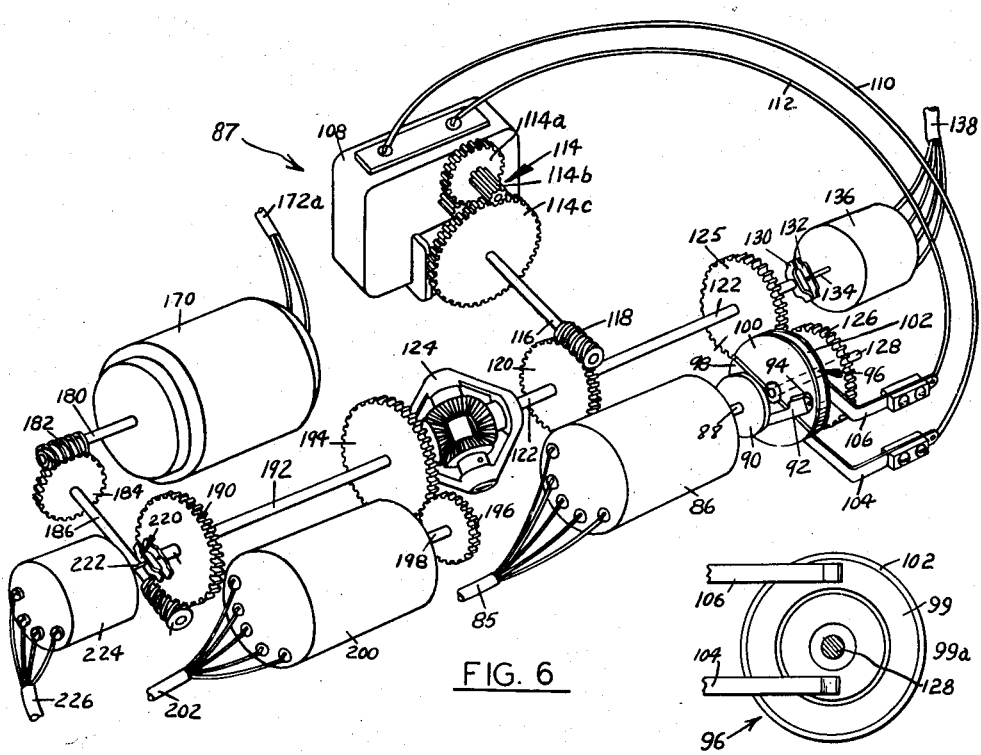
FIG. 6
FIG. 6A
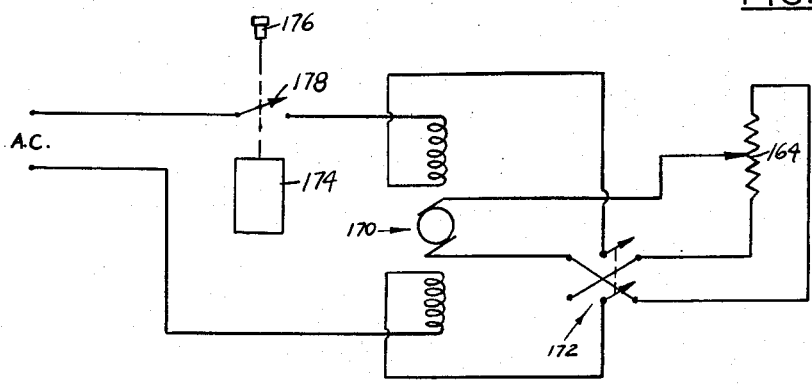
FIG. 9
ZOLTAN TAKATS
INVENTOR.
BY Donald T. Hillier
Philip S. Hopkins
ATTORNEYS

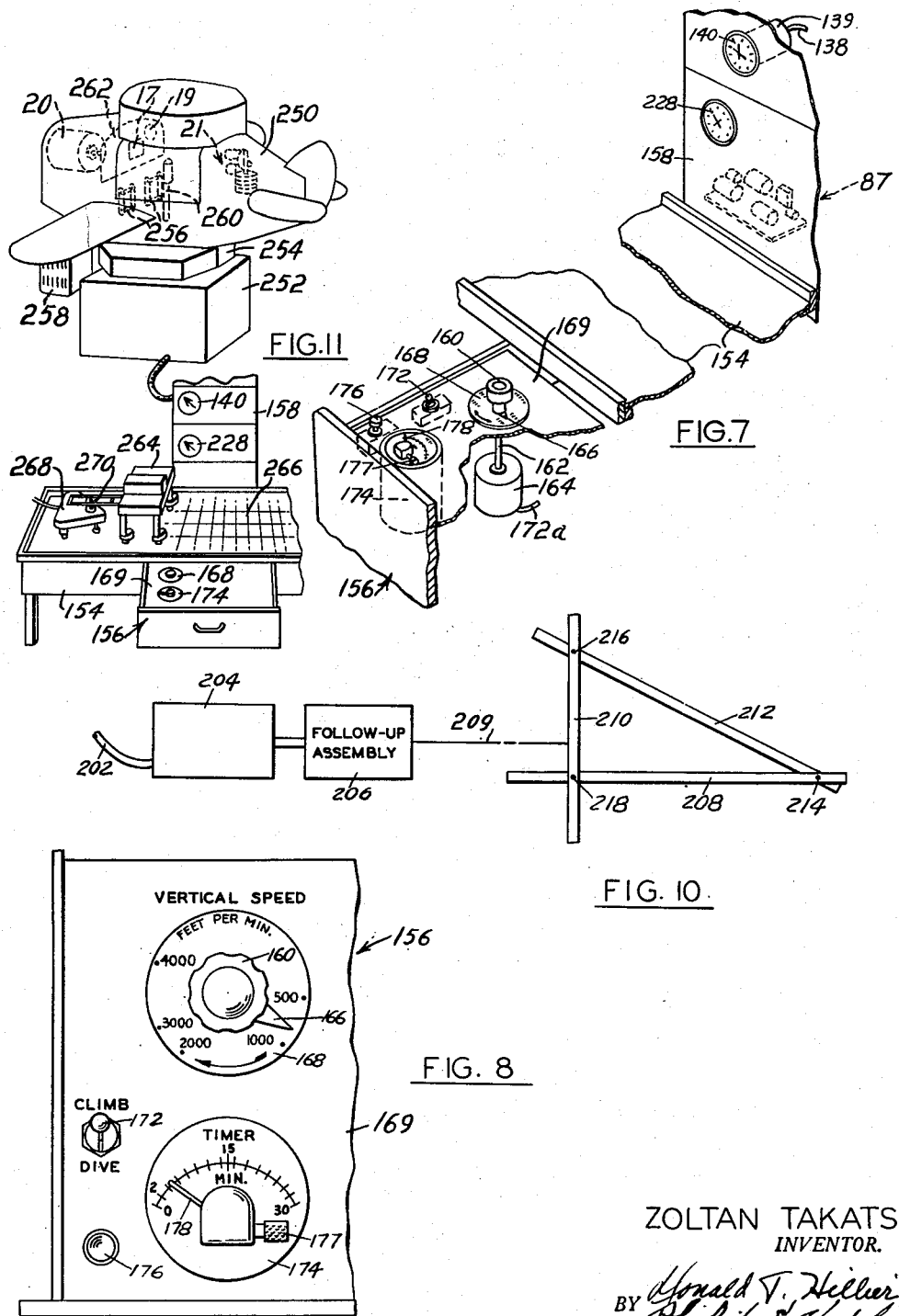

Patented June 6, 1950

2,510,529

UNITED STATES PATENT OFFICE 2,510,529

DIVING AND CLIMBING TARGET SIMULATOR FOR GROUND TRAINERS

Zoltan Takats, Vestal, N. Y., assignor to Link Aviation, Inc., a corporation of New York Application February 21, 1945, Serial No. 579,010

2 Claims. (Cl. 35—10.4)

This invention relates to a device for use in training personnel in the use of radar equipment, and more particularly, in the training of personnel to fly an airplane by means of radar.

In order that the general nature of this invention may be better understood, reference is made to Fig. 1 which is a schematic view of one kind of radar screen or C scope 17 and range meter 19 to which the pilot of a combat plane may refer when piloting the plane by means of radar.

Fig. 1 shows that the pilot's screen and range meter are side by side. The pilot's screen is commonly referred to as the C scope and has upon its face a plurality of horizontal as well as a plurality of vertical lines. A scale is associated with each set of lines, and it will be seen that the central vertical line is designated 0, while the lines to either side of this zero line are successively designated by increasing increments of 15 up to 90.

The horizontal lines are likewise designated in increasing increments of 15 beginning with the designation of minus 20 for the lowermost line and continuing up to plus 60.

The range meter is provided with a needle adapted to move over two scales one above the other, the outer scale being graduated in miles from zero to ten and the inner scale being graduated in feet from zero to fifteen thousand. Means are provided whereby the scales are selectively used, depending upon the distance of the target from the radar equipped plane.

One typical use of radar is in a fighter plane which is attempting to intercept a target plane. It is this particular situation which the preferred embodiment of my invention will be described as simulating, although it will be readily apparent that the invention may readily be applied to the simulation of all types of navigation by radar.

In order that the objects of my invention may be more readily understood the geometrical relationships between a fighter plane and a target plane should be borne in mind. Inasmuch as it is assumed that it is the fighter which is equipped with radar, it is the position of the target relative to the fighter which is considered.

Three factors will locate the position of the target relative to the fighter:

1. Target azimuth angle, which is the angle between the fighter's longitudinal axis and the projection of the line of sight from the fighter to the target on the plane through the lateral and longitudinal axes of the fighter. Azimuth is measured from the end of the projection of the longitudinal axis corresponding to the nose of the plane clockwise or counterclockwise through 180°, but the specific type of radar indicating equipment being considered only indicates azimuth up to 90° left or right. If azimuth is greater than 90° the target image is not shown upon the scope.

This definition is illustrated in Fig. 2 where the line L—L' designates the direction of flight and the fighter's longitudinal axis; the line F—Ta is the line of sight from the fighter to the target; F—Ta' designates the projection of the line of sight F—Ta on the plane P through the lateral T—T' and longitudinal L—L' axes of the fighter, and the azimuth angle is so labelled.

2. Target elevation angle, which is the angle between the line of sight from the fighter to the target and the plane through the lateral and longitudinal axes of the fighter.

This definition is illustrated in Fig. 3 where P illustrates the plane of the lateral T—T' and longitudinal L—L' axes of the fighter, F—Ta is the line of sight from the fighter to the target and the target elevation angle is so designated.

3. Target slant range, which is the distance along the line of sight from the fighter to the target is illustrated in Fig. 4.

It is these three factors which are given by the C scope and range meter carried by a real fighter plane equipped with radar. In real radar carried by a fighter plane the plane is equipped with means which cause the image on the scope to be positioned according to the azimuth and elevation angle of the target. Also, the radar equipment causes the range meter to register in accordance with the distance of the target from the fighter. The radar indicating means therefore indicate the azimuth, elevation angle and range of the target.

When the radar equipment carried by a plane is set in operation, if a target plane be within the field of operation of the equipment, an image such as that shown at Ta in Fig. 1 appears upon the screen.

The azimuth of the target as previously defined is conveyed to the pilot of the radar equipped plane by the position of the image on the screen relative to the vertical line marked zero. If the image appeared as shown in Fig. 1 the azimuth of the target would be 15 degrees right. The target elevation angle is indicated to the pilot by the position of the image relative to the scale at the right of the screen, and in the illustrated case is plus 20 degrees. At the same time the range meter shows the slant range of the target from the fighter—in the illustrated case the slant range being 8½ miles. If the radar equipment continues in operation, and the target remains within the field of operation thereof, the position of the target relative to the fighter is continuously given by the scope and range meter. The position of the target relative to the axes of the fighter as shown by the scope and meter changes in response to the following movements of the target:

1. Changes in the latitude of the target.
2. Changes in the longitude of the target.
3. Changes in the altitude of the target.

Furthermore, the position of the target relative to the axes of the fighter as shown by the radar indicating means changes in response to the following movements of the fighter:

4. Changes in the latitude of the fighter.
5. Changes in the longitude of the fighter.
6. Changes in the altitude of the fighter.
7. Changes in the position of the fighter about its vertical axis.
8. Changes in the position of the fighter about its longitudinal axis.
9. Changes in the position of the fighter about its transverse axis.

As far as the first six mentioned factors are concerned it is deemed unnecessary to show in detail how changes in each of these factors affect the position of the target relative to the fighter in terms of the three basic concepts defined above. It is clear that the relative positions of two points in space in terms of azimuth, angular difference in height and distance may change as either point changes its position in any one of the three possible directions of movement, or combinations thereof. Considering the last three mentioned factors, it is clear that a change in the position of the fighter about its vertical axis, i. e., a turning of the fighter, will produce a change in the azimuth of the target. As far as factor 8 is concerned, let us assume that the target is 90° from the nose of the fighter, i. e., directly abeam, and that the fighter changes its position about its longitudinal axis—that is, it banks. It is clear that the target elevation angle will be changed by an amount equal to the bank. And as far as the last mentioned factor is concerned, in the event the target is directly ahead of the fighter, i. e., its azimuth is zero, a change in the fighter's position about its lateral axis—i. e., a diving or a climbing thereof, will produce a change in the target elevation angle by an amount equal to the change about the lateral axis. Banking and pitching of a fighter plane variously affect target azimuth angle and target elevation angle, as is well understood by those skilled in the art.

Grounded training equipment for simulating the responses of real radar indicating equipment to changes in the above outlined basic factors in actual flight are known to the prior art. Such training equipment is disclosed in the United States Patent 2,396,857 dated Mar. 19, 1946, and issued to Raymond E. Kittredge for Training device. Referring to Fig. 11, such training equipment may include an aviation trainer of the type covered by U. S. Patents 1,825,462 and 2,099,857. These trainers comprise a fuselage 250 universally and rotatably mounted upon a stationary base 252. The conventional octagon 254 is shown. This trainer in apparatus of the type being considered represents the fighter plane. The fuselage may bank, climb and dive, and it may turn indefinitely in either direction. The student in the fuselage, by means of the rudder pedals 256 in the fuselage which actuate the turning motor 258, may cause the fuselage 250 to turn in either direction. By means of the control column or stick 260 which is also in the fuselage, the student may cause the fuselage to bank, climb and pitch by means of the banking, pitching and climbing bellows (not shown) which are actuated by the movement of the control column. All of these movements of the fuselage in and of themselves form no part of this invention. For a detailed disclosure of how these fuselage movements may be accomplished, reference is made to United States Patents 1,825,462 and 2,099,857.

As disclosed in the United States Patent 2,396,857, in the interior of the fuselage 250 upon the instrument panel 262 is the previously described radar indicating means, viz., the C scope 17 and range meter 19 are placed.

Upon a table 154 remote from the trainer fuselage is a recorder 264 which represents the target, and this recorder may, under the control of an operator, be made to move in any direction and at varying rates across a chart 266 on the table, as disclosed in the above mentioned Patent 2,396,857. Therefore the direction and speed of horizontal movements of the target are simulated by the direction and speed of the target recorder's movements.

Also mounted upon the same chart and table is a recorder which shows the assumed geographical location of the fighter. This recorder 268 may be of the type described in United States Patent 2,179,663. Its movement over the chart is automatically directionally responsive to changes in the heading of the trainer fuselage 250 and its speed of movement varies according to the assumed horizontal speed of the trainer. The direction and speed of horizontal movements of the fighter are therefore simulated by the direction and speed of this second recorder's movements. Thus, the position of the target recorder 264 on the chart 266 at all times represents the assumed latitude and longitude of the target, while the position of the fighter recorder 268 on the chart 266 at all times represents the assumed latitude and longitude of the fighter. The two recorders are interconnected by arm 270.

These two recorders are mechanically coupled and connected to the radar indicating means 17 and 19 so that a movement of either one relative to the other, through an intermediate system of electrical and mechanical elements, produces the same changes in the position of the image Ta on the radar scope and in the range meter's reading that corresponding real changes in the latitude and longitude of a real target and of a real fighter would produce on the radar scope and meter in the fighter.

Further, means are provided to change the radar indicating means in response to a turning, banking and pitching of the fuselage 250 of the trainer in simulation of the changes which occur in the radar indicating means carried by a real fighter when the fighter makes corresponding movements. It should be noted that the factors of target azimuth and target elevation angle may change in response to the turning, banking, climbing and diving of the plane equipped with radar, and that the radar indicating means respond to these movements. This is because radar equipment is designed to indicate the position of the target relative to the longitudinal, lateral and vertical axes of the radar equipped plane. Latitude, longitude and altitude of the radar equipped plane also are determining factors, but as far as the target is concerned, the only determining factors are latitude, longitude, and altitude. In other words the target may be considered to be a point having location only.

Lastly, in trainers of the type disclosed in the United States Patent 2,396,857, a manual control whereby the operator or instructor may introduce into the mechanism the assumed altitude of the target is provided, and means are employed whereby the assumed altitude of the fighter is automatically introduced into the apparatus. The assumed altitudes of the fighter and target are, in the two just-mentioned applications, differentially combined, the differential result being used to determine the length of one side of a mechanical triangle. By providing a mechanical triangle having one side of a length proportional to the assumed altitude difference and a second side of a length proportional to the assumed ground range, as illustrated in Fig. 4 the third side is of a length proportional to target slant range and the angle between the second and third sides is the altitude angle which is defined as the angle between a horizontal plane through the fighter and the line of sight to the target. Altitude angle, when modified by the pitching and banking of the fighter, becomes target elevation angle which is shown by the radar indicating means.

My invention relates to improved means for introducing into the apparatus the factor of change in the assumed altitude of the target, and to improved means for combining the assumed altitude of the target with the assumed altitude of the fighter.

In order that the nature of my invention may be better understood reference is made to the accompanying drawings wherein a preferred embodiment of my invention is illustrated. In the drawings, Fig. 1 is an illustrative view of one kind of radar screen or C scope and range meter presently used in radar equipped planes, Figs. 2, 3 and 4 illustrate certain geometrical relations between two planes in autual flight, Fig. 5 is a disclosure of the fighter altitude transmitter which may be combined with my invention, Fig. 6 is a detailed view of my improved altitude differential unit, Fig. 6A is a detailed view of a portion of the apparatus shown in Fig. 6.

Fig. 7 is a showing of the instructor's control and instrument panels,

Fig. 8 shows in detail a portion of the instructor's control panel,

Fig. 9 is a circuit diagram of a part of my invention,

Fig. 10 is a schematic showing of the mechanical triangulating means which may be used with my invention, and Fig. 11 is a general view showing training equipment of the type to which this invention relates.

The disclosed embodiment of my invention includes in several places the well known system of remote actuation by Teletorques and Telegons. A general explanation of this system is therefore believed desirable. Each of these systems includes a transmitter and receiver suitably supplied with electrical energy and connected by means of a cable. The transmitter includes a housing and a rotor, the rotor usually being referred to as the input shaft, and the receiver also includes a housing and a rotor, but the rotor of the receiver is referred to as the output shaft. When the input shaft of the transmitter is turned in one direction, the output shaft of the receiver simultaneously moves in one direction and through the same angle. By selectively coupling the transmitter and receiver, for a movement in one direction of the input shaft the output shaft may be made to move in the desired direction. Teletorques are used when a relatively strong source of power is available to move the input shaft; otherwise Telegons are employed.

Target altitude angle has been defined as the angle between a horizontal plane through the fighter and the line of sight from the fighter to the target. This concept is illustrated in Fig. 4 where the point P represents the position in space of the fighter plane and the line L—L' represents the direction of movement of the fighter while the point Ta represents the position in space of the target plane.

Figure 1:
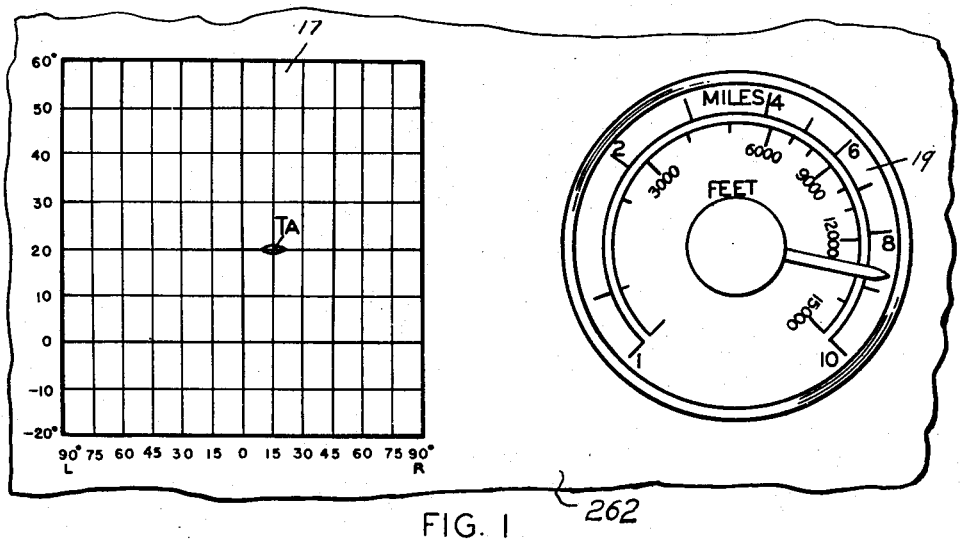
Figure 2:
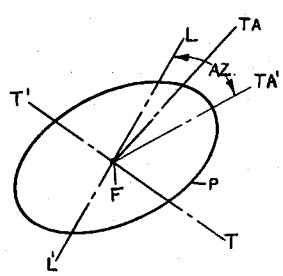
Figure 4:
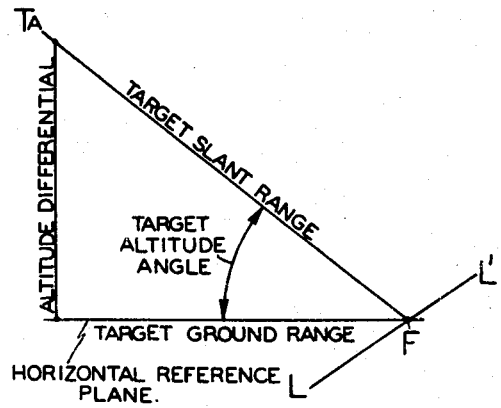
Figure 3:
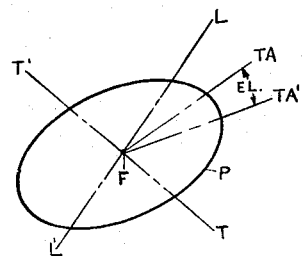

Target Slant Range is defined as the distance along the line of sight from the fighter to the target and in Fig. 4 is represented by the line so designated. Target Ground Range is the horizontal projection of the target slant range and is illustrated in Fig. 4 by the line designated target ground range.

Altitude differential is defined as the difference in altitude between the fighter and target planes, and is represented in Fig. 4 by the line so designated.

From this discussion of Fig. 4 it will be appreciated that given the factors of ground range and altitude differential, the factors of altitude angle and slant range may be readily determined. Means for introducing the factor of altitude differential into a mechanical triangulating unit will now be disclosed.

Altitude differential is the difference in altitude between the fighter and target planes. When the target is higher than the fighter the altitude differential is considered positive; when lower it is considered negative.

From this definition of altitude differential, it will be realized that in order to introduce this factor the two basic factors of fighter altitude and target altitude must be combined to give the resulting altitude differential.

First, means will be described for introducing the factor of fighter altitude, then means will be disclosed for introducing the factor of target altitude, and then it will be shown how these two factors are combined in this invention to give the factor of altitude differential.

As is well known the altitude of a plane in actual flight depends upon two basic factors—first, the power setting of the plane and second, the attitude of the plane, i. e., whether the plane is climbing or diving—and, of course, the length of time that the plane has flown at its various power settings and attitudes.

In trainers of the type disclosed in U. S. Patent 2,099,857 there is an altitude tank connected to a source of reduced air pressure and to the atmosphere. When the combined positions of the simulated throttle lever and attitude of the fuselage are such that if a real airplane had a corresponding throttle setting and attitude the plane would gain altitude, the tank in the trainer is connected through a valve to the source of reduced pressure. On the other hand, when the combined positions of the simulated throttle lever and fuselage attitude are such that if a real airplane had a corresponding throttle setting and attitude the plane would lose altitude, the tank in the trainer is connected through a valve to the atmosphere. In this way the pressure within the tank is always inversely proportional to the assumed altitude of the trainer—the higher the pressure the lower the assumed altitude.

Figure 5:
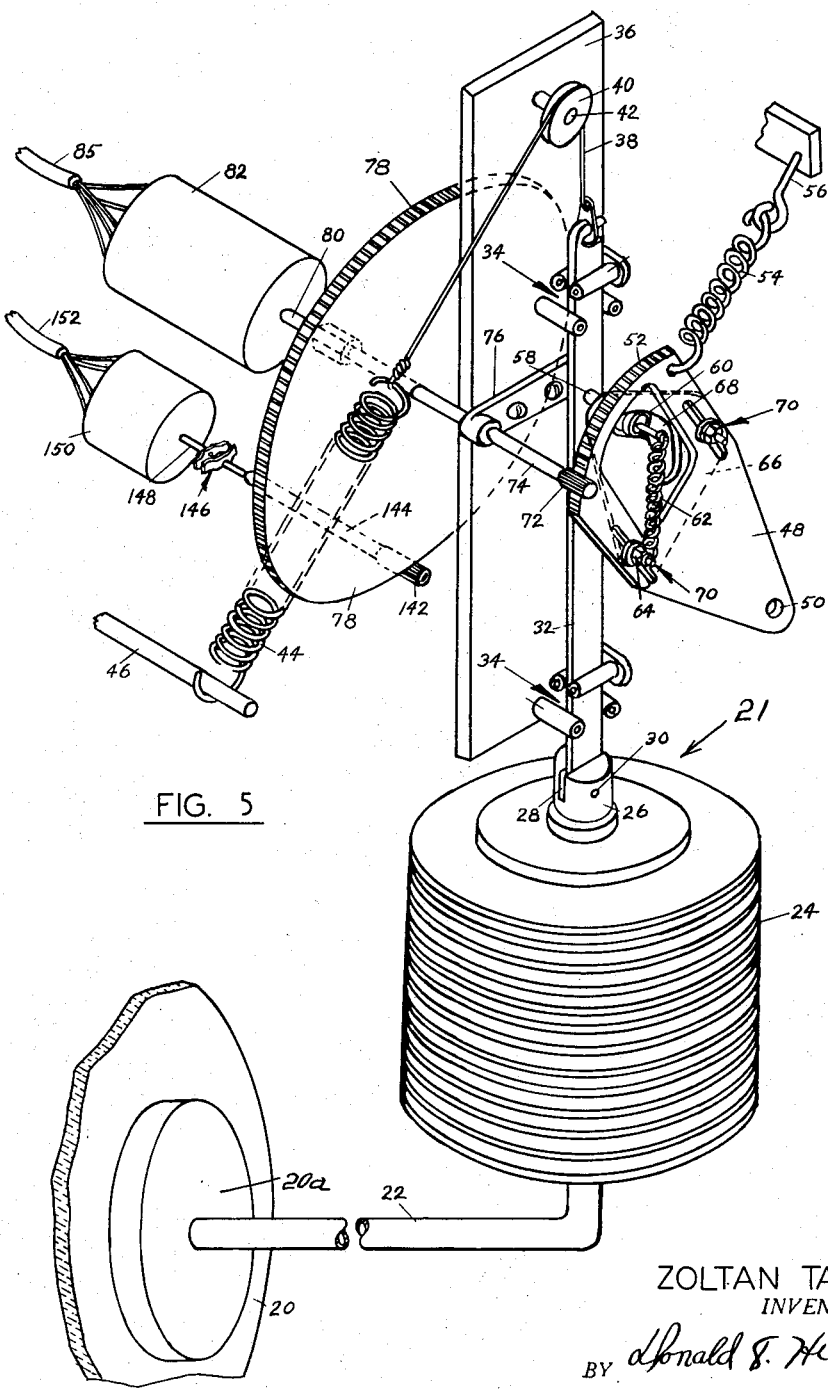

Reference is made to Fig. 5 which is a detailed disclosure of the fighter altitude transmitter which may be combined with my invention. The apparatus shown in Fig. 5 is designated generally by 21, and its general location is shown in Fig. 11. In Fig. 5 the altitude tank is designated 20, the connector 20a, and this tank is preferably in the Link trainer which, as is fully explained in the United States Patent 2,396,857, represents the radar equipped fighter plane. The pressure within this tank, it may be concluded, varies inversely with the assumed altitude of the fighter represented by the Link trainer.

In Fig. 5 the altitude tank 20 is shown to be connected by means of line 22 to the large collapsible-expansible bellows 24. Affixed to the upper end of bellows 24 is member 26 which has a slot 28 and pin 30 arranged to hold one end of reciprocating arm 32 which travels in a plurality of rollers 34 suitably attached to plate 36 which is affixed to the inside of the fuselage of the Link trainer or equivalent device. To the other end of arm 32 is affixed cord 38 which travels in pulley 40 suitably held by shaft 42 which is held by plate 36. The other end of this string is affixed to one end of tension spring 44, the other end of which is suitably attached to any fixed part 46 of the unit.

A plate 48 is pivoted at the point 50 to a suitable fixed part of the unit, and formed integrally with plate 48 is gear segment 52. A tension spring 54 is suitably attached to a corner of gear segment 52 as shown, the other end of this spring being attached to a fixed part 56 of the unit. A shaft 58 is affixed to slide 32 and shaft 58 has mounted thereupon near its outer end roller 60, and a spring 62 has one of its ends attached to the extreme outer end of shaft 58 while its other end is suitably attached to a bolt 64 carried by plate 48. A plate 66, made separate from plate 48 for adjustment purposes, and having an arcuate slot 68 is suitably attached to the inside of plate 48 by means of a pair of bolt, nut and slot arrangements 70.

Meshing with gear segment 52 is pinion 72 formed integrally with shaft 74 held by bracket 76 attached to plate 36. Fixedly mounted upon this shaft 74 is a large spur gear 78. The input shaft 80 of the fighter altitude transmitting Teletorque 82 is connected to shaft 74 for rotation therewith. Transmitter 82 is connected by means of cable 84 with fighter altitude receiver Teletorque 86 shown in Fig. 6.

Reference is made to Fig. 6 which is a detailed view of the altitude integrating unit which forms an important part of my invention. This unit is designated generally by 87 and may be located as shown in Fig. 11. Upon the output shaft 88 of fighter altitude receiver 86 is carried a disc 90 which has attached thereto an arm 92 carrying contact roller 94. The assembly designated generally 96 includes a pair of split contact segments 98 and 100 carried by an insulating disc 102. As seen in Fig. 6A, a pair of collector rings 99 and 99a are mounted upon the other side of the insulating disc 102 from the contact segments, these collector rings being concentric, mutually insulated and each is engaged by the brushes 104 or 106. Also, the collector ring 99 is in electrical contact at all times with the segment 98 and ring 99a is similarly arranged with respect to the segment 100. Further, the segments 98 and 100 are mutually insulated. Drive motor 108 is connected to the brushes 104 and 106 by means of conductors 110 and 112. When the contact roller 94 engages both of the split segments 98 and 100, motor 108 is not energized. But when as a result of the rotation of the output shaft 88 of the fighter altitude receiver 86 roller 94 is moved out of engagement with one of the split contact segments 98 or 100, motor 108 is energized, the direction of turning of the motor depending upon which segment is out of contact with the roller 94. Whenever motor 108 is energized, by means of gear train 114 which includes gears 114a, 114b and 114c, the shaft 116 having formed integrally therewith the worm 118 is rotated and gear 120 fixedly mounted upon the input shaft 122 of the altitude differential 124 is turned. The turning of shaft 122 at the same time results in a rotation of gear 125 which is affixed upon this shaft and gear 125 drives gear 126 which is fixedly mounted upon the shaft 128 carrying the split contact segments, insulating disc, and collector rings of the assembly 96. Motor 108 therefore continues to run until it repositions the assembly 96 to the point that both of the split contact segments again are in engagement with the contact roller 94. At this instant motor 108 stops.

Thus motor 108 is directionally controlled by the direction of rotation of the output shaft 88 of receiver 86, and the magnitude of the output of the motor depends upon the angle through which shaft 88 is turned.

Referring again to Fig. 5, a reduction in the pressure within the altitude tank 22 which, as previously explained occurs whenever there is an increase in the assumed altitude of the fighter 12, causes a collapsing of bellows 24 and slide 32 will move downwardly in Fig. 5. A movement in that direction will result in a similar movement of shaft 58 and roller 60. This roller coacting with arcuate slot 68 causes a counterclockwise pivoting of plate 48 resulting in a clockwise turning of pinion 72, gear 78 and of the input shaft 80 of the fighter altitude transmitter 82. The output shaft 88 of the fighter altitude receiver 86, shown in Fig. 6, will therefore move in the desired direction, resulting in an energization of follow-up motor 108 which will turn the output shaft 116 in the proper direction. The input shaft 122 of the altitude differential 124 will therefore be rotated and at the same time the split gear segments 98 and 100 of assembly 96 are properly rotated to bring both of these segments back into engagement with contact roller 94, at which instant motor 108 stops.

An increase in pressure within the altitude tank 22, on the other hand, will result in an expansion of bellows 24 and by means of the just disclosed apparatus the follow-up motor 108 will be energized in the opposite direction from that explained in the preceding paragraph and the direction of movement of the input shaft 122 of differential 124 will be in the opposite direction. Similarly, the split gear segments 98 and 100 of assembly 96 will be rotated in the opposite direction to bring both of these segments back into engagement with contact roller 94.

The foregoing discloses therefore means whereby the input shaft 122 of the altitude differential 124 is rotated directionally and in magnitude in accordance with changes in the assumed altitude of the fighter represented by the Link trainer.

Parenthetically, it can be here pointed out that mounted upon the right end of shaft 122, as seen in Fig. 6, is the primary member 130 of a permanent-magnet type magnetic coupling, the other member of which is 132. These conventional magnetic couplings are used for ease in installation. Member 132 is affixed upon the input shaft 134 of the fighter altitude transmitting Telegon 136 which is connected by means of cable 138 to a receiver Telegon 139 which is a part of the instructor's fighter altimeter 140, seen in Fig. 7. By virtue of this magnetic coupling shown in Fig. 6 the input shaft 134 of the fighter altitude transmitting Telegon 136 rotates in accordance with the rotations of the input shaft 122 of the altitude differential. The output shaft of the receiver Telegon in simulated altimeter 140 follows the movements of the input shaft 134, as is well understood in the art, and therefore the altimeter 140 indicates to the instructor changes in the assumed altitude of the fighter. At the same time, in Fig. 5 is shown a pinion 142 formed integrally with shaft 144 which through magnetic coupling 146 turns the input shaft 148 of the Telegon transmitter 150 connected by cable 152 to a Telegon receiver (not shown) which is a part of the simulated altimeter conventionally mounted upon the student's instrument panel in the Link trainer. Rotations of gear 142 in response to changes in the assumed altitude of the fighter thus affect the indications of the simulated altimeter which indicates to the student in the Link trainer his assumed altitude.

Considering now the factor of assumed target altitude, reference is made to Fig. 7 which is a detailed disclosure of the instructor's control and information panels. In Fig. 7 the table 154 is provided, and it is upon this table that the fighter and target recorders are mounted for movement to simulate changes in the assumed latitude and longitude of the fighter and target planes. The instructor's control drawer is designated 156 and his information panel is 158.

As seen in Fig. 7, there is disclosed a knob 160 affixed upon the upper end of vertical shaft 162 which positions the contact (not shown) of potentiometer 164. A pointer 166 is also attached to the vertical shaft 162 and arranged to move over a dial 168 which is affixed upon the top 169 of the instructor's control drawer 156. The potentiometer 164 is connected to motor 170 in Fig. 6 by means of cable 172a.

As shown in Fig. 8, dial 168 is calibrated to represent the assumed target vertical speed. Reference is now made to Fig. 9 where the field windings and armature of the motor 170 are shown together with the potentiometer 164, a double-pole double-throw reversing switch 172, a conventional timer 174 and a reset switch 176. By reference to Fig. 9 is seems clear without a detailed description that the setting of the potentiometer 164 determines the speed of motor 170 while the setting of the reversing switch 172 determines the direction of running of this motor. Also, when the reset switch 176 is pressed by the operator, the switch 178 in the timer 174 is closed, thus setting the motor 170 in operation at a rate dependent upon the setting of potentiometer 164 and in a direction dependent upon the position of switch 172.

With this arrangement the instructor may set the knob 160 so that the pointer 166 indicates in conjunction with dial 168 the proper assumed target vertical speed, reversing switch 172 according to whether it is assumed that the target is climbing or diving, and by means of knob 177 the pointer 178 of the timer may be set according to the length of time, in minutes, that the instructor desires the assumed vertical movement of the target to take place. These steps having been taken, motor 170 in Fig. 6 runs in a direction, at a speed and for a length of time that the assumed vertical movement of the target occurs. When the assumed time has elapsed, timer 174 opens switch 178 and motor 170 stops.

Referring now to Fig. 6, affixed upon the output shaft 180 of motor 170 is the worm 182 which drives the worm gear 184 affixed upon shaft 186 which has upon its outer end worm 188 arranged to drive the worm gear 190 affixed upon the second input shaft 192 of the altitude differential 124. Inasmuch as the direction of turning of the output shaft 180 of motor 170 is in accordance with the assumed direction of vertical movement of the target while the speed of motor 170 is proportional to the assumed rate of vertical movement of the target, and inasmuch as this motor runs for as long as the target is assumed to be moving vertically, it is clear that the shaft 192 introduces into the altitude differential 124 a movement proportional to assumed changes in the altitude of the target. The differential 124 therefore combines the movements of shaft 192 and those of shaft 122—the movements of the latter shaft being in accordance with the assumed changes in the altitude of the fighter represented by the Link trainer—so that the gear 194 affixed upon the frame of the differential 124 has a total movement imparted thereto proportional to the difference between the assumed altitude of the fighter and the assumed altitude of the target. Thus the gear 194 is always positioned in accordance with the assumed altitude difference. This same motion is transmitted to the gear 196 which is mounted upon the input shaft 198 of the altitude difference transmitter 200 which is connected by means of cable 202 to the altitude difference receiving Teletorque 204 shown in Fig. 10.

(Parenthetically, referring to Fig. 6, by means of magnetic coupling 220 arranged to turn the input shaft 222 of the target altitude transmitting Telegon 224 connected by cable 226 to a receiver Telegon associated with target altitude indicator 228 seen in Fig. 7, the indicator 228 at all times indicates to the instructor the assumed target altitude.)

The output shaft of the altitude difference receiving Teletorque is arranged to energize a motor which is a part of the schematically-shown follow-up assembly 206 so that the output of this motor is directionally controlled according to whether there is an increase or decrease in the assumed altitude difference. Further, this motor has an output proportional to the assumed altitude difference. Inasmuch as this follow-up assembly is similar in construction and operation to the follow-up assembly described in detail in connection with Fig. 6, a detailed showing and explanation at this point is deemed unnecessary.

Still referring to Fig. 10, there is shown schematically a mechanical triangle comprising a ground range side 208, an altitude difference side 210 and a slant range side 212. Illustratively speaking, the slant range arm 212 may be pivoted to the fixed ground range arm 208 at the fixed point 214, and the pivoted slant range arm 212 may be slidably pivoted to the altitude difference arm 210 at the point 216. The altitude difference arm crosses the ground range arm 208 at the movable point 218, arm 210 being slidable along arm 208 but always being positioned perpendicular thereto. Thus the distance from the fixed point 214 to movable point 218 is variable but always proportional to the assumed ground range, movable as disclosed in the above mentioned Patent 2,396,857. Means may be provided for moving the altitude difference arm 210 to the left of point 214 in accordance with changes in the assumed ground range as determined by the distance between the fighter and target recorders upon the table 154. Also, the distance from the point 218 to the movable point 216 is variable but always proportional to the assumed altitude difference, and as shown in the same copending applications, the arm 210 may be positioned by the motor in follow-up assembly 206 through the driving connection 209 so that the distance from point 218 to point 216 always is proportional to the output of the altitude differential 124 seen in Fig. 6. Thus the distance from point 214 to point 216 is variable and always proportional to the assumed slant range and the angle between arms 208 and 212 is variable and always equal to the assumed altitude angle. The distance from point 214 to point 216 may be measured by a suitable take-off to cause the range meter 19 to indicate the assumed slant range, while the altitude angle may be introduced into suitable mechanism to be integrated with the pitching and banking attitude of the Link trainer to produce the assumed elevation angle which properly positions the image Ta on the screen 17 as far as elevation angle is concerned.

My invention therefore discloses a novel arrangement for differentially combining the assumed fighter and target altitudes to properly position an element in accordance with this assumed factor. Also, a much superior arrangement for introducing the factor of assumed target altitude is provided. The instructor may change the factor of assumed target altitude over any desired length of time, at any desired rate and in either direction. Thus the factor of assumed target altitude is introduced into the mechanism in close simulation of the manner that a real target plane in actual flight would change its altitude. Consequently, the range meter and screen have their indications changed very realistically.

Those skilled in the art will appreciate that many changes may be made in the preferred disclosed embodiment of my invention without departing from the substance thereof. Also, my invention may be used for other purposes than those specifically disclosed herein. Such changes and uses are intended to be covered by the following claims.

I claim:
1. In a grounded navigation training system the combination of an instrument for indicating the assumed altitude of an airplane; a motor connected to said instrument for changing the indication of said instrument; a circuit associated with said motor and including a switch for starting said motor, a reversing switch for determining the direction of running of said motor and a potentiometer having a movable part for determining the speed of said motor; means for positioning the movable part of said potentiometer according to the assumed vertical speed of an airplane; means for positioning said reversing switch according to the assumed direction of vertical movement of an airplane; and means including a selectively operable timing device for stopping said motor after the elapse of a selected time from the closing of said first switch.

2. In a grounded navigation training system the combination of a dial graduated in terms of assumed vertical speed; a pointer arranged for movement over said dial; a motor; a circuit including a first switch, a potentiometer having a movable part for determining the speed of said motor and a reversing switch for determining the direction of said motor; means movable with said pointer for changing the position of the movable part of said potentiometer; means for positioning said reversing switch; means for closing said first switch; and a timer for opening said first switch after the elapse of a preselected length of time from the closing thereof.

ZOLTAN TAKATS.

REFERENCES CITED

The following references are of record in the file of this patent:

UNITED STATES PATENTS

| Number | Name | Date |
|---|---|---|
| 1,393,456 | Ruggles | Oct. 11, 1921 |
| 1,825,462 | Link | Sept. 29, 1931 |
| 2,099,857 | Link | Nov. 23, 1937 |
| 2,179,663 | Link | Nov. 14, 1939 |
| 2,321,799 | Cone | June 15, 1943 |
| 2,364,539 | Link | Dec. 5, 1944 |
| 2,396,857 | Kittredge | Mar. 19, 1946 |
| 2,438,898 | Campbell | Apr. 6, 1948 |
| 2,438,940 | Pennoyer | Apr. 6, 1948 |
| 2,439,169 | Kittredge | Apr. 6, 1948 |
| 2,442,297 | Link | May 25, 1948 |
| 2,442,788 | Treptow | June 8, 1948 |
| 2,459,150 | Crane et al. | Jan. 18, 1949 |